United States Patent [19]

Purviance

[11] Patent Number: 5,042,542
[45] Date of Patent: Aug. 27, 1991

[54] ROUTER TABLE GAUGE

[76] Inventor: John R. Purviance, 34 Foremast, Salem, S.C. 29676

[21] Appl. No.: 578,191

[22] Filed: Sep. 6, 1990

[51] Int. Cl.⁵ .................. B27G 23/00; B25H 1/02; B27C 5/00
[52] U.S. Cl. .................. 144/134 A; 33/201; 33/628; 144/134 R; 144/253 R; 144/253 J
[58] Field of Search .......... 144/134 R, 134 A, 253 R, 144/253 J; 409/214, 218; 33/336, 338, 628, 201

[56] References Cited

U.S. PATENT DOCUMENTS

| | | | |
|---|---|---|---|
| 2,085,235 | 6/1937 | Tantz | 144/253 J |
| 3,724,084 | 4/1973 | McNeece | 33/201 |
| 4,186,784 | 2/1980 | Stone | 144/253 J |
| 4,532,716 | 8/1985 | Steiner | 33/201 |
| 4,623,286 | 11/1986 | Hih | 33/628 |

Primary Examiner—W. Donald Bray
Attorney, Agent, or Firm—Cort Flint

[57] ABSTRACT

A gauge (40) for use with a router table assembly (10) to accommodate bit and fence settings thereon. The router table assembly has a table work surface (18) which includes a fence (32) which is adjustable longitudinally of the work surface and a bit (28) which is adjustable transversely of the work surface. The gauge comprises a frame mounted to a side of the router table assembly, the frame is capable of being moved to an operative location adjacent to the work surface in which position adjustment of the fence and the bit may be made and to an inoperative position away from the router surface in which position the surface is clear for router work.

20 Claims, 3 Drawing Sheets

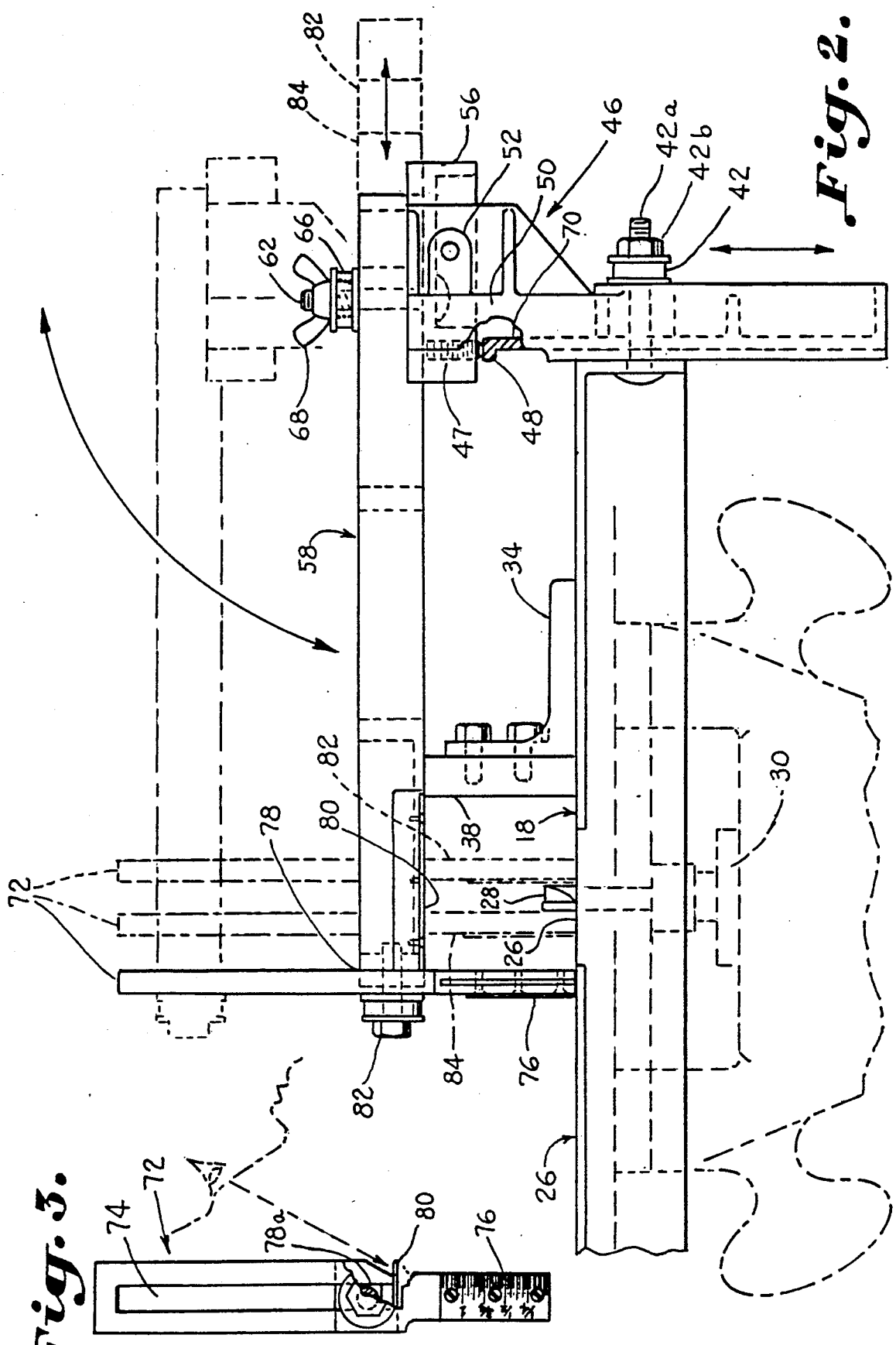

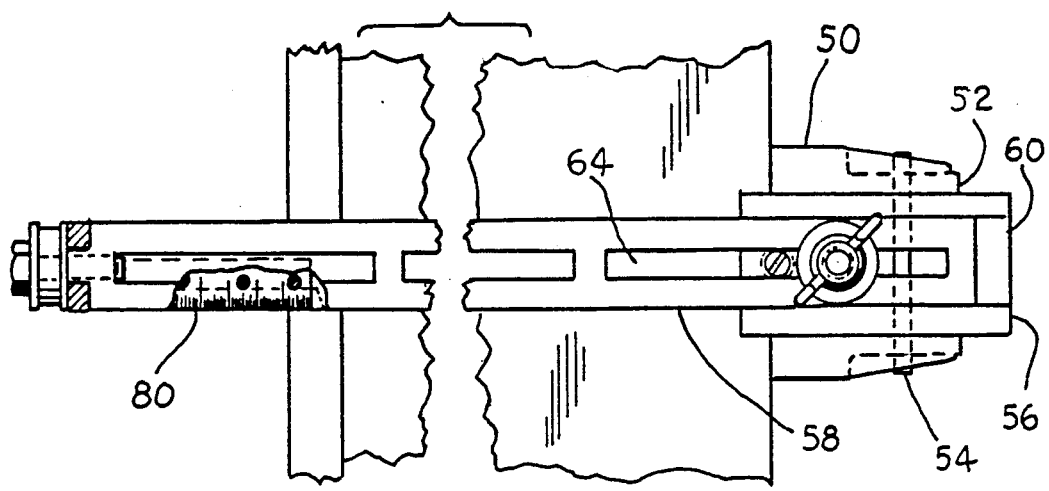
*Fig.5.*
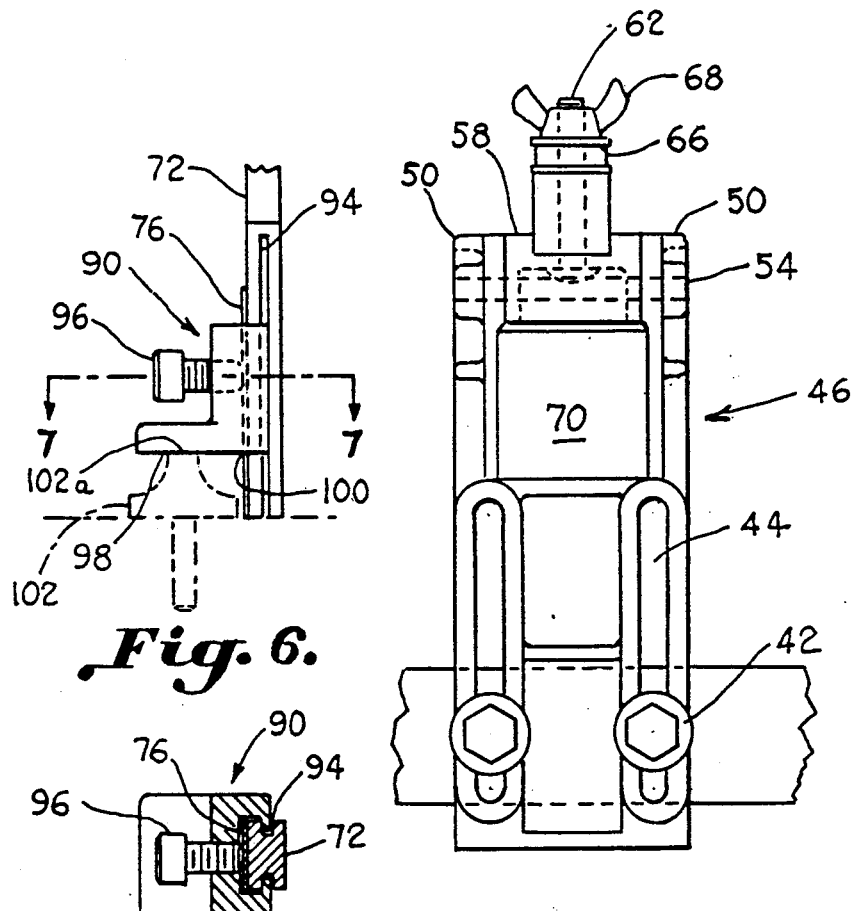
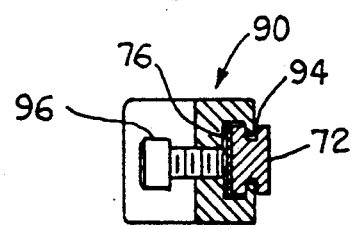
*Fig.6.*
*Fig.7.*
*Fig.4.*

ROUTER TABLE GAUGE

BACKGROUND OF THE INVENTION

The invention relates to a gauge for setting the vertical depth and horizontal distances of a router bit cut on a router table assembly. Router table assemblies which include a fence transversely adjustable relative to the router bit so as to allow adjustments of the horizontal cut are well known. Also, routers which include means which adjust to the bit vertically relative to the working surface of the table assembly so as to allow adjustments of the vertical cut are well known. To make these adjustments has been a very time consuming, cumbersome, and imprecise operation. The opening through which the router bit extends is of such a size that it is difficult to place a measuring scale on the work surface and adjacent to the bit. This makes accurate placement of the scale very difficult. Further, the bit adjusting means is typically a part of the router which is arranged below and at the center of the working surface of the router table. This presents a very awkward situation when trying to adjust the bit while at the same time hold the scale in position to determine that adjustment.

U.S. Pat. No. 4,186,784 shows a router table assembly including a scale to allow adjusting of the fence. This arrangement does not provide means to assist in the adjustment of the bit nor are the scales for adjusting the fence in the vicinity of the bit. U.S. Pat. No. 727,337 discloses structures which allow adjustment of a dual fence but does not disclose gauge means associated with the assembly to determine the adjusted position. These arrangements do not overcome the above referred to problems.

Accordingly, an object of the invention is to overcome the drawbacks of the prior art arrangements by providing a gauge for a router table assembly capable of facilitating adjustment of the fence relative to the bit regardless of the height of the fence and adjustment of the bit relative to the working surface regardless of the diameter or shape of the bit.

SUMMARY OF THE INVENTION

The present invention overcomes the above drawbacks by providing a gauge member with vertical and horizontal scales as a part of the table assembly. The gauge member may be placed in a first, free standing position behind the cutter and adjacent to it. The operator may then reach under the table and accurately adjust the vertical position of the bit to the depth needed as read on the vertical scale. The gauge member is then relocated in front of the cutter at a point on the cutting edge of the cutter level with the top of the table. The fence then may be set by moving it so its front face is set to the required depth of cut as read on the horizontal scale. Upon completion of the adjustment, the gauge is pivoted to an inoperative position to the rear of the working surface. The gauge may be made from any suitable material such as die cast aluminum, injection molded plastic (nylon), steel, or wood. The router table assembly typically comprises a router which includes a router plate through which a bit passes and a bit adjustment mechanism. The bit adjustment mechanism moves the bit vertically relative to the plate surface. A router fence with mounting brackets is provided. The router table has an upper surface provided with a pair of slots for mounting the router fence for longitudinal movement. The router fence is mounted on the upper surface for transverse movement relative to the bit. The gauge member comprises a frame mounted to a rear side of the router table assembly. The gauge member includes a setting arm and an over arm. The over arm includes a pivot block and a mounting block. The setting arm is adjustably mounted to a first end of the over arm. A second end of the over arm is adjustably mounted to the pivot block. The pivot block is pivotally mounted to the mounting block and the mounting block is vertically adjustable relative to the router table side so as to accommodate various fence heights. The setting arm may be adjusted vertically relative to the over arm. The over arm may be adjusted longitudinally relative to the mounting block so as to accommodate router cutters from 1/16 inch to 1¼ inches in diameter. The mounting block may be adjusted vertically relative to the work surface.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein:

FIG. 2 shows a side view with the gauge member constructed in accordance to the invention with a first dotted line position illustrated for setting the vertical cutter depth, and a second dotted line position shown for setting the horizontal depth;

FIG. 3 is a partial left hand end view of the gauge member of FIG. 2;

FIG. 4 is a right hand end view of the gauge member of FIG. 2;

FIG. 5 is a top view of the gauge member of FIG. 2;

FIG. 6 is a side elevation illustrating an alternate embodiment of the invention; and FIG. 7 is a sectional view taken along line 7—7 of FIG. 6.

DESCRIPTION OF A PREFERRED EMBODIMENT

Figure 1:
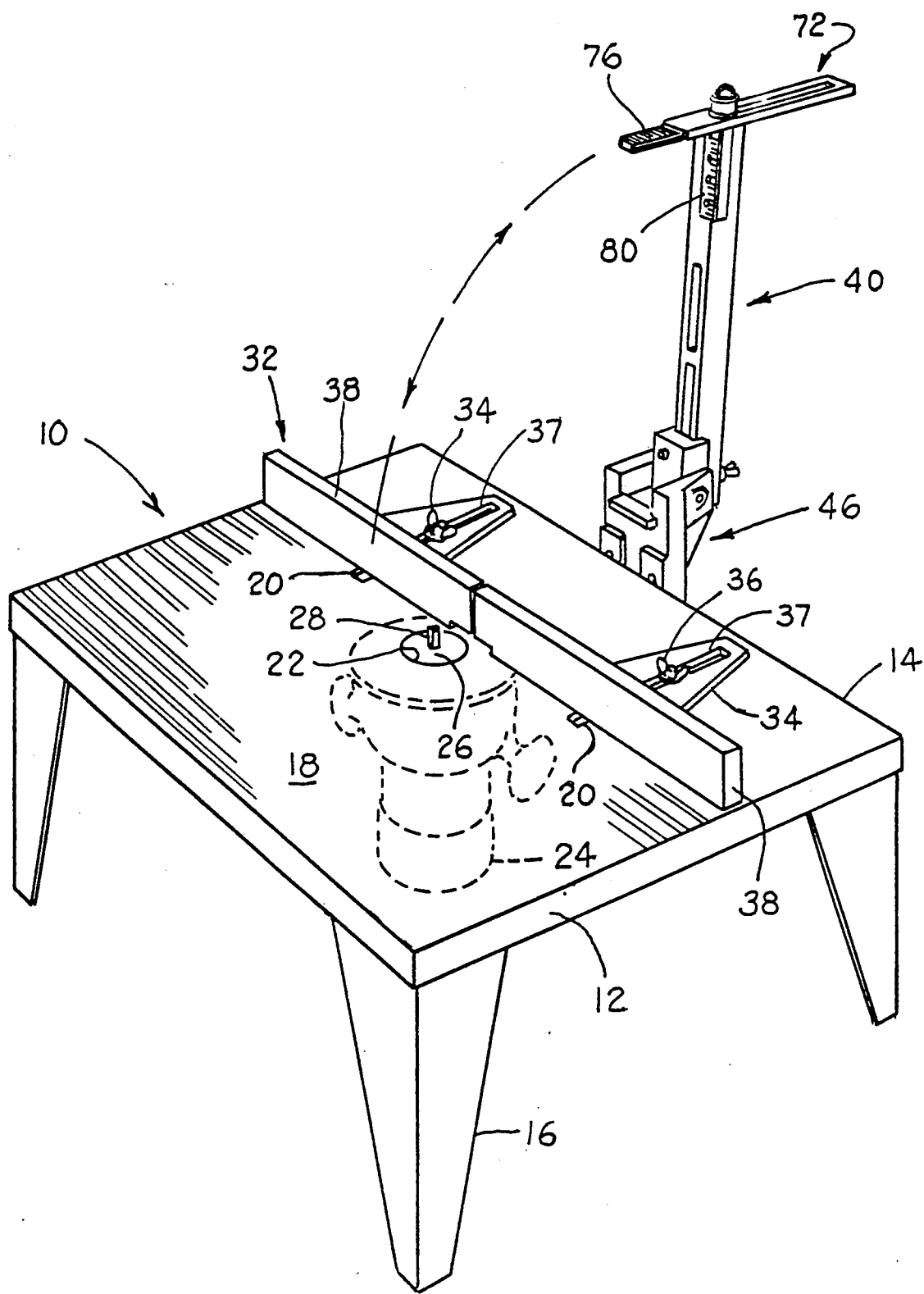
FIG. 1 is a perspective view of a router table having a gauge member constructed in accordance to the invention in an inoperative position.

Referring now in more detail to the drawings, a gauge assembly for use with a router table for setting the vertical and horizontal cut is shown in FIG. 1 of the drawings. Router table 10 may be of any known construction, such as Model No. 2948 sold by SEARS of Chicago, Ill. The router employed with router table 10 may be of any known type as it does not constitute a part of the invention. As shown in FIG. 1, table 10 includes sides 12 and 14, support legs 16, and work table surface 18. There are provided two slots 20 and a router plate receiving hole 22 in the work surface 18 of router table 10. Router 24 includes a router plate 26 having an opening therein through which bit 28 penetrates and typically includes means 30 which adjusts the bit vertically relative to the surface of said router plate. The router plate is secured in hole 22 of working surface 18 s that bit 28 extends transverse to the plane of said working surface. Vertical adjustment of the bit determines the vertical depth of the cut made by the router.

Fence 32 is adjustably secured to the working surface, as can best be seen in FIGS. 1 and 2. For normal routing cuts, the fence consists of a pair of separated mounting brackets 34, and work guide members 38 which form a two piece fence. Guide member 38, which is usually formed of wood, is not always the same height. Guide member 38 need not necessarily be formed as two pieces, but can be one piece for ordinary edge forming cuts. The two piece fence allows for the router to be used for light planing of the edge of work pieces. This requires setting the right hand side for depth and bringing the left hand side flush with the cutter face. Each bracket 34 is provided with a slot 37. Slots 20 in the working surface are arranged to cooperate with slots 37 of the brackets to receive securing means 36 so that the fence may be adjusted longitudinally of working surface 18 and transversely relative to the vertical position of bit 28. This adjustment of the fence relative to the bit determines the horizontal depth or distance of the cut made by the router.

As shown in FIGS. 1, 2, 4 and 5, gauge 40 is secured to side 14 of router table 10 by spring-loaded washer assemblies 42 having bolts 42a which pass through holes in the table side and through a pair of slots 44 arranged in one end of mounting block 46. Preferably the gauge is mounted on the rear side of the table by drilling holes through the table rim 12a in line with the two vertical slots in the mounting block. Bolts are then inserted through the holes and the slots, spring loaded washer assemblies 42 are then placed on bolts 42a and these are held by hex nuts 42b. The gauge is then adjusted to its working position by using the slots in the mounting block and a tilt adjusting set screw 47 so the overarm rests on top of the fence and is parallel to the top of the table surface. This brings gauge setting arm 72 square to the top of the table and parallel to the face of the fence. The bottom of the setting arm is then adjusted to be flush with the top of the table. Spring loaded washer assemblies 42 allow the parts of the gauge to move under tension and holds them in place as they are checked for squareness and location. Tilt set screw 47 compensates for any out of squareness of the mounting surface with the top of the table. Once the gauge is set to the table it is mounted and the mounting bolts are tightened and the gauge is ready for use.

The mounting block is sized to accommodate various fence heights. Spring-loaded washer assemblies 42 secure mounting block 46 in a vertically adjusted position relative to working surface 18. Mounting block 46 has at its forward upper end a horizontal shelf 48 arranged between a pair of spaced vertical extensions 50. Ears 52 extend rearwardly on side of extensions 50 and are adapted to receive pin 54 for pivotal motion. Pin 54 is carried by pivot block 56 which carries over arm 58. Pivot block 56 is preferably two and one half inches long while the length of over arm 58 is sized to fit the table it is to be used on. A tapped hole is provided in one end of pivot block 56 and an adjusting set screw 58 is arranged for vertical movement in the tapped hole. Set screw 58 engages with shelf 48 so as to adjust the horizontal position of over arm 58 so that the arm may be maintained at parallel with table top 18. There is a groove 60 formed longitudinally along the top surface of pivot block 56 which is adapted to receive over arm 58. Bolt 62 passes through pivot block 56 and through longitudinal slot 64 formed in an end of over arm 58. A spring and washer assembly 66 is arranged between wing nut 68 and over arm 58 so that the over arm is resiliently secured to pivot block 56 when the wing nut is loosened but is locked tight when the wing nut is tightened. The pivot block extends rearwardly of pin 54 a sufficient distance so that its end engages a vertical surface 70 of mounting block 46 when over arm 58 is moved to a substantially vertical position and acts to retain the gauge in that position. This substantially vertical position of the gauge member is its inoperative position.

The spacer assembly 66 is used on all clamping fasteners. This allows all sliding parts to be held under spring pressure when making adjustments by partially loosening the nut involved. After making the required adjustment the nut is retightened to lock the part in place. This arrangement allows for very precise adjustments to be made when installing the gauge on the table and when using the gauge to set cutter height and fence position.

As best shown in FIGS. 2, 3 and 5, setting arm 72 which has a slot 74 formed at one end thereof and a scale 76, arranged at its opposite end, is secured transversely to end 78 of over arm 58. So that arm 72 remains square in use, a square projection 78a is formed on the end 78 of over arm 58 and extends into slot 74 of arm 72 (as can best be seen in FIG. 3). Scale 80 is attached to a lower edge of over arm 58 so as to extend from end 78 toward pivot block 56. A bolt 82 carrying an elastic washer passes through slot 74 and resiliently secures setting arm 72 against end 78 of the over arm. The setting arm length is designed to fit the table it is to be used on. As shown in FIGS. 3 and 5, over arm 58 has a lower edge adjacent to end 78 cut away so that the scale 80 may be read from above. This allows the operator to make adjustment settings for the fence from a standing position.

In operation, gauge 40 is moved to its operative position, as can best be seen in FIG. 2, in which the end of setting arm 72 engages working surface 18 and scale 76 extends vertically from that surface. In a gauge, first position, shown in dotted lines at 82, over arm 58 is adjusted relative to pivot block 56 so that scale 76 of setting arm 72 is against and behind bit 28 to set the cutter bit for the vertical cut depth. In a second gauge position, shown in dotted line position 84, setting arm 72 is in front of and against cutter 28, and the fence can be easily and accurately positioned to the horizontal cut depth required by using scale 80.

Referring now to FIGS. 6 and 7, an alternate embodiment of the invention will now be described which includes a slider 90 which slides vertically on setting arm 72 to set the vertical cut depth. Slider 90 has a pair of inwardly extending legs 92 received in grooves 94 formed in setting arm 72 which provide means for moving slider 90 vertically (FIG. 7). Slider 90 can be locked in place by a set screw 96. A cutter engaging abutment 98 is carried on the bottom of slider 90. Abutment 98 is a planar surface and can be read at scale 76 at a surface line of intersection 100 against the scale. Slider 90 provides a means of accurately setting the heights of radius or angle cutters whose top point is a distance away from the cutting surface. As can best be seen in FIG. 6, slider 90 may be set at the desired vertical cutting depth by reference to scale 76, and placed next to cutter 102. Cutter 102 is then adjusted (raised) vertically to engage abutment 98. This provides an accurate setting for the vertical cut. Otherwise, the operator has to guess at the vertical adjustment of cutter 102 by using a line of sight from the tip 102a of cutter 102 to the markings on scale 76.

Upon completion of these settings, gauge 40 is moved to its inoperative position shown in FIG. 1 by causing over arm 58 to be pivoted about pin 54 so as to extend in a substantially vertical position. The working surface is now cleared for router work.

While a preferred embodiment of the invention has been described using specific terms, such description is for illustrative purposes only, and it is to be understood that changes and variations may be made without departing from the spirit or scope of the following claims.

What is claimed is:

1. A router table assembly comprising:
   a router table having an upper table surface with a table opening;
   a router carried by said router table having a bit which passes through said table opening and a bit adjustment means for moving said bit normal to said table surface;
   a router fence having mounting brackets;
   slot means formed in said table surface for mounting said router fence for movement on said table surface;
   means mounting said router so that said bit extends vertically through said table opening;
   means mounting said router fence on said table surface for transverse movement relative to said bit;
   a gauge member carried by said router table and including a horizontal scale and a vertical scale;
   said gauge member being movable between an operative position in which said horizontal and vertical scales are disposed near said table surface for determining the vertical position of said bit and the transverse position of said fence and an inoperative position in which said horizontal and vertical scales are located away from said table surface and said table surface is clear for router work.

2. The device according to claim 1 wherein said fence comprises an elongated back strip, a pair of mounting brackets secured to a first side of said back strip, a work guide member secured to a second side of said back strip opposite to said first side.

3. The device according to claim 3 wherein said work surface is provided with a pair of spaced slot means, securing means arranged to extend through said slots and through said mounting brackets so as to selectively secure said fence in position relative to said bit.

4. The device according to claim 1 wherein said gauge member includes a setting arm, a vertical scale mounted on one end of said setting arm, said one end of said setting arm being positioned adjacent to said bit and said table surface when said gauge member is in said operative position.

5. The device according to claim 4 wherein said gauge member includes an over·arm, said over arm having a longitudinal scale arranged adjacent to one end thereof, said longitudinal scale being positioned transverse the longitudinal direction of said fence and adjacent to the top of said fence when said gauge member is in said operative position.

6. The device according to claim 1 wherein said gauge member includes a setting arm, an over arm including a pivot block and a mounting block, means adjustably securing said setting arm to a first end of said over arm, means adjustably mounting a second end of said over arm to said pivot block, means pivotally mounting said pivot block with said mounting block and means mounting said mounting block for vertical adjustment relative to said work surface of said router table whereby said setting arm may be adjusted vertically relative to said over arm, said over arm may be adjusted longitudinally relative to said mounting block and said work surface and said mounting block may be adjusted vertically relative to said work surface.

7. The device according to claim 1 wherein said gauge member includes an over arm, a horizontal scale secured adjacent a first end of said over arm, said first end of said over arm being positioned substantially adjacent a top of said fence when said gauge member is in said operative position and said first end is shaped so as to allow said scale to be read from above said over arm.

8. The assembly of claim 1 wherein said router includes a router plate through which said router bit passes and said router plate is mounted within said table opening.

9. A gauge for use with a router table assembly to accommodate bit and fence settings, said router table assembly having a table work surface which includes a fence which is adjustable longitudinally of said surface and a bit which is adjustable transversely of said surface, said gauge comprising a frame attached to a side of said router table assembly, means mounting said frame for movement between an operative position adjacent to said work surface in which position a desired adjusted position for said fence and said bit may be determined and to an inoperative position away from said table work surface in which position said gauge is clear of said work surface.

10. The device according to claim 9 wherein said fence comprises an elongated back strip, a pair of mounting brackets secured to a first side of said back strip, a work guide member secured to a second side of said back strip opposite to said first side.

11. The device according to claim 10 wherein said work surface is provided with a pair of spaced slot means, securing means arranged to extend through said slots and through said mounting brackets so as to selectively secure said fence in position relative to said bit.

12. The device according to claim 9 wherein said gauge includes a setting arm, a vertical scale mounted on one end of said setting arm, said one end of said setting arm being positioned adjacent to said bit and said table surface when said gauge is in said operative position.

13. The device according to claim 9 wherein said gauge includes an over arm, said over arm having a longitudinal scale arranged adjacent to one end thereof, said longitudinal scale being positioned transverse the longitudinal direction of said fence and adjacent to the top of said fence when said gauge is in said operative position.

14. The device according to claim 9 wherein said gauge includes a setting arm, an over arm including a pivot block and a mounting block, means adjustably securing said setting arm to a first end of said over arm, means adjustably mounting a second end of said over arm to said pivot block, means pivotally mounting said pivot block with said mounting block and means mounting said mounting block for vertical adjustment relative to said work surface of said router table whereby said setting arm may be adjusted vertically relative to said over arm, said over arm may be adjusted longitudinally relative to said mounting block and said work surface and said mounting block may be adjusted vertically relative to said work surface.

15. The device according to claim 9 wherein said gauge includes a vertically disposed mounting block having a pair of extensions pivotally carrying an over arm, and means adjustably securing said mounting block to a side of said router table.

16. The device according to claim 15 wherein said extensions include a pair of rearwardly directed ears, means adjustably mounting said over arm to a pivot block, and means pivotally mounting said pivot block to said ears.

17. The device according to claim 16 wherein said mounting block includes a horizontal shelf at a first side, said pivot block having a vertically disposed set screw in one end thereof, said set screw being adapted to engage said shelf so as to provide means for parallel adjustment of said over arm.

18. The device according to claim 16 wherein said pivot block is of sufficient length so as to engage with said mounting block when said gauge is in the inactive position so as to maintain said over arm in a substantially vertical position away from said work surface.

19. The device according to claim 9 wherein said gauge includes an over arm, a horizontal scale secured adjacent a first end of said over arm, said first end of said over arm being positioned substantially adjacent a top of said fence when said gauge is in said operative position.

20. The device according to claim 19 wherein said first end is shaped so as to allow said scale to be read from above said over arm.

* * * * *